(12) United States Patent
Shimizu et al.

(10) Patent No.: US 7,992,385 B2
(45) Date of Patent: Aug. 9, 2011

(54) HYDRAULIC CONTROL DEVICE

(75) Inventors: Tetsuya Shimizu, Anjo (JP); Akira Noguchi, Anjo (JP); Kazuyuki Noda, Anjo (JP); Masaki Yoshida, Okazaki (JP); Tooru Matsubara, Toyota (JP); Kenta Kumazaki, Toyota (JP); Atsushi Tabata, Okazaki (JP); Ryuji Ibaraki, Nishikamo-gun (JP); Yuji Iwase, Mishima (JP); Takuma Kakinami, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 797 days.

(21) Appl. No.: 12/078,698

(22) Filed: Apr. 3, 2008

(65) Prior Publication Data
US 2008/0256943 A1 Oct. 23, 2008

(30) Foreign Application Priority Data
Apr. 20, 2007 (JP) .................... 2007-111835

(51) Int. Cl.
*F16D 31/02* (2006.01)
(52) U.S. Cl. ............... 60/456; 60/337; 60/454
(58) Field of Classification Search ........... 60/329, 60/337, 454, 456
See application file for complete search history.

(56) References Cited

U.S. PATENT DOCUMENTS

| | | | | | |
|---|---|---|---|---|---|
| 3,808,810 | A | * | 5/1974 | Schott et al. | 60/456 |
| 5,890,509 | A | * | 4/1999 | Becker et al. | 60/329 |
| 6,029,445 | A | * | 2/2000 | Lech | 60/456 |
| 6,845,614 | B2 | * | 1/2005 | Stahlman | 60/456 |
| 6,881,165 | B2 | * | 4/2005 | Endo et al. | 474/28 |
| 7,582,042 | B2 | * | 9/2009 | Sato et al. | 477/158 |
| 7,617,676 | B2 | * | 11/2009 | Fukushima et al. | 60/337 |
| 7,819,768 | B2 | * | 10/2010 | Kinugasa et al. | 475/5 |

FOREIGN PATENT DOCUMENTS

| | | |
|---|---|---|
| JP | A 57-040147 | 3/1982 |
| JP | A 06-272762 | 9/1994 |
| JP | A 2000-018380 | 1/2000 |
| JP | A 2002-340160 | 11/2002 |
| JP | A 2005-273880 | 10/2005 |
| JP | A-2006-291981 | 10/2006 |

* cited by examiner

*Primary Examiner* — Michael Leslie
(74) *Attorney, Agent, or Firm* — Oliff & Berridge, PLC

(57) ABSTRACT

A hydraulic control device includes an oil pan; an oil pump; a strainer; a pressure regulating valve; an oil cooler; a cooler bypass valve with an input port that is connected with a cooler supply oil passage through which the hydraulic oil to be supplied to the oil cooler flows, wherein the input port is communicatively connected with an output port when the hydraulic pressure of the hydraulic oil within the cooler supply oil passage is equal to or greater than a predetermined valve opening pressure; and a cooler bypass oil passage that connects the output port of the cooler bypass valve with an intake oil passage between the strainer and the intake port of the oil pump.

26 Claims, 3 Drawing Sheets

HYDRAULIC CONTROL DEVICE

INCORPORATION BY REFERENCE

The disclosure of Japanese Patent Application No. 2007-111835 filed on Apr. 20, 2007 including the specification, drawings and abstract is incorporated herein by reference in its entirety.

BACKGROUND

The present invention relates to a hydraulic control device.

There exists a hydraulic control device that supplies hydraulic oil to a vehicle driving apparatus such as an automatic transmission. Japanese Patent Application Publication No. JP-A-2006-291981, for example, describes a hydraulic control device of a hybrid driving apparatus. The hydraulic control device is equipped with two types of oil pumps, a mechanical oil pump and an electric oil pump, and generates hydraulic pressure by discharging hydraulic oil that has been taken in from an oil pan via a strainer from the oil pumps. The hydraulic pressure generated by the oil pumps is then adjusted to a predetermined line pressure by a pressure regulating valve and supplied to respective portions. Destinations to which the adjusted hydraulic pressure is supplied include lubricating oil passages of respective portions of the hybrid driving apparatus and control valves for controlling the operation of friction engagement elements. Destinations to which the adjusted hydraulic oil is supplied also include an oil cooler for cooling hydraulic oil.

Provided in the hydraulic control device is a check valve acting as a cooler bypass valve on an upstream side of the oil cooler. If the hydraulic pressure of the hydraulic oil supplied to the oil cooler is too high, then the cooler bypass valve is opened to drain the hydraulic oil. Accordingly, a structure is achieved in which excessive hydraulic pressure does not act on the oil cooler. In addition, the hydraulic control device is structured such that hydraulic oil that has passed through the oil cooler, hydraulic oil that was drained when the cooler bypass valve opened, and hydraulic oil supplied to the lubricating oil passages of respective portions are all discharged to the oil pan.

SUMMARY

However, the following problems can be found with the structure of the above-described art. Namely, under a condition of low oil temperature and high hydraulic oil viscosity, the hydraulic oil stays longer in the respective portions of the vehicle driving apparatus, and more time is thus needed until the hydraulic oil returns to the oil pan. The level of hydraulic oil in the oil pan is consequently lowered, and depending on the vehicle running condition, air may be taken in by the oil pump and result in a temporary decrease in hydraulic pressure.

In addition, the hydraulic oil returned to the oil pan is again taken in via the strainer and discharged by the oil pump. A pressure loss occurs in this case when the hydraulic oil passes through the strainer, and the pressure loss is larger particularly under the condition of low oil temperature and high hydraulic oil viscosity. Therefore, especially in the case of a low oil temperature, a large amount of hydraulic oil passing through the strainer is accompanied by a decrease in oil pump efficiency.

The present invention provides a hydraulic control device capable of suppressing an intake of air by an oil pump and capable of increasing an oil pump efficiency, even under a condition of low oil temperature and high hydraulic oil viscosity. The present invention can also achieve other advantages.

According to an exemplary aspect of the invention, a hydraulic control device includes an oil pan; an oil pump; a strainer that is provided between the oil pan and an intake port of the oil pump; a pressure regulating valve that adjusts a hydraulic pressure of hydraulic oil supplied from the oil pump to a predetermined pressure; an oil cooler that is supplied with the hydraulic oil whose pressure has been adjusted by the pressure regulating valve and that cools the hydraulic oil; a cooler bypass valve with an input port that is connected with a cooler supply oil passage through which the hydraulic oil to be supplied to the oil cooler flows, wherein the input port is communicatively connected with an output port when the hydraulic pressure of the hydraulic oil within the cooler supply oil passage is equal to or greater than a predetermined valve opening pressure; and a cooler bypass oil passage that connects the output port of the cooler bypass valve with an intake oil passage between the strainer and the intake port of the oil pump.

BRIEF DESCRIPTION OF THE DRAWINGS

Various exemplary aspects of the invention will be described with reference to the drawings, wherein.

DETAILED DESCRIPTION OF EMBODIMENTS

1. First Embodiment

Figure 1:
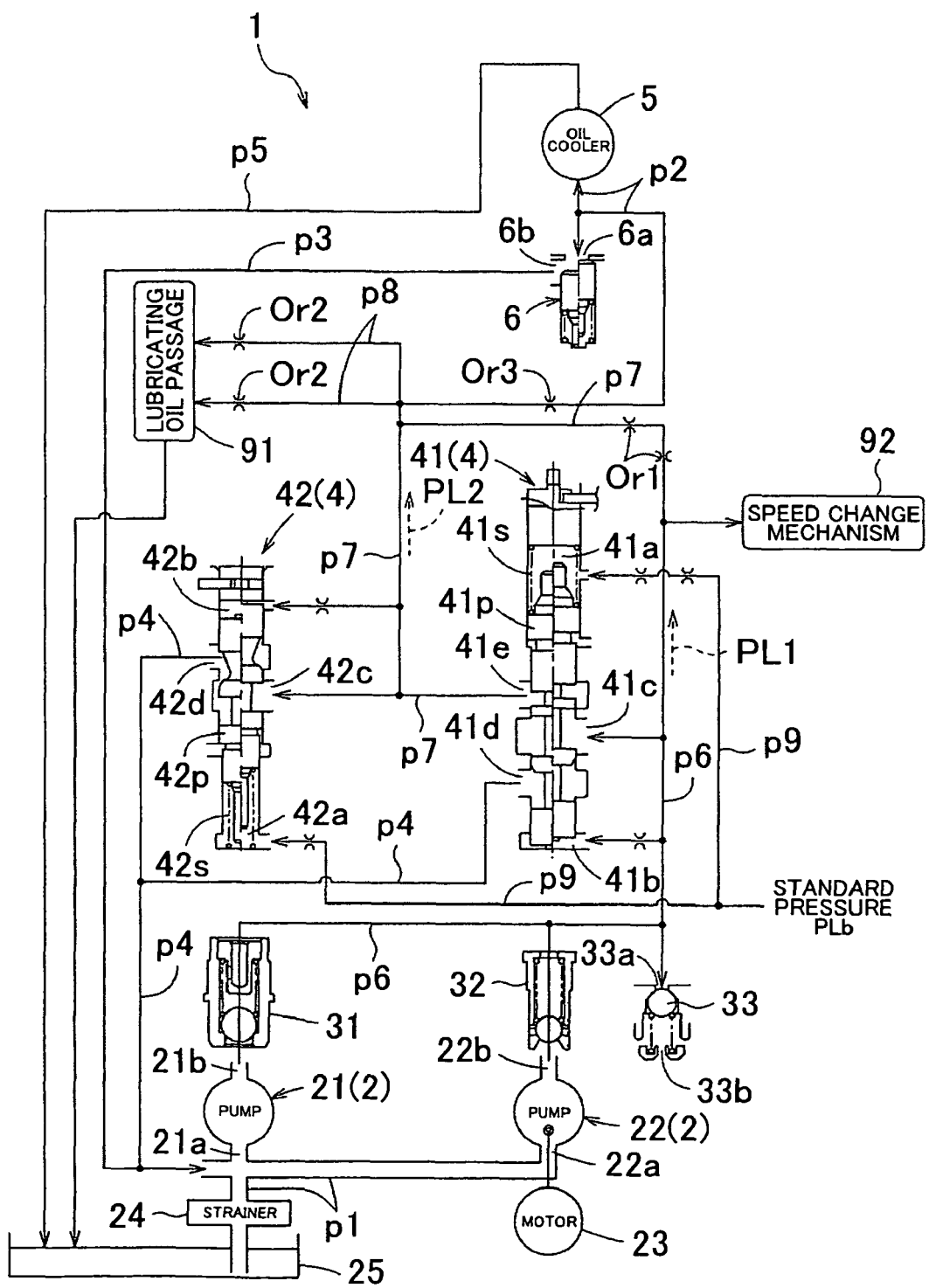
FIG. 1 is a drawing showing the structure of a hydraulic circuit of a hydraulic control device according to a first embodiment of the present invention.

A first embodiment of the present invention will be explained with reference to the drawings. FIG. 1 is a drawing showing the structure of a hydraulic circuit of a hydraulic control device 1 according to the present embodiment. Here, an example will be described in which the hydraulic control device 1 according to the present invention is applied to a device for supplying hydraulic oil to respective portions of a vehicle driving apparatus equipped with at least a speed change mechanism 92.

1-1. Oil Pump Area

As shown in FIG. 1, the hydraulic control device 1 according to the present embodiment includes two oil pumps that serve as an oil pump 2, a mechanical oil pump 21 driven by an engine (not shown) and an electric oil pump 22 driven by an electric motor 23. The mechanical oil pump 21 and the electric oil pump 22 intake hydraulic oil from intake ports 21a, 22a and discharge hydraulic oil from discharge ports 21b, 22b, respectively. In the present embodiment, one of the mechanical oil pump 21 and the electric oil pump 22 corresponds to a first oil pump of the present invention and the other corresponds to a second oil pump. Note that in the following description, reference to the oil pump 2 collectively means both the mechanical oil pump 21 and the electric oil pump 22.

The mechanical oil pump 21 and the electric oil pump 22 are connected to a strainer 24 via an intake oil passage p1. The strainer 24 is provided between an oil pan 25 and intake ports 21a, 22a of the mechanical oil pump 21 and the electric oil pump 22. When hydraulic oil accumulated in the oil pan 25 is taken in by the oil pump 2, the strainer 24 acts as a filter for removing foreign substances contained in the hydraulic oil. The intake oil passage p1 is an oil passage that connects the strainer 24, the discharge port 21b of the mechanical oil pump 21, and the discharge port 22b of the electric oil pump 22. The intake oil passage p1 is in a negative pressure state as a general rule during operation of the mechanical oil pump 21 and the electric oil pump 22. The oil pan 25 holds hydraulic oil, and hydraulic oil that has circulated through respective portions of the vehicle driving apparatus, including a lubricating oil passage 91 and the speed change mechanism 92, is discharged to the oil pan 25.

Also, the mechanical oil pump 21 and the electric oil pump 22 discharge hydraulic oil to a first oil passage p6 via respective backflow preventive valves 31, 32. Here, the first backflow preventive valve 31 is provided downstream of the mechanical oil pump 21, and the second backflow preventive valve 32 is provided downstream of the electric oil pump 22. The backflow preventive valves 31, 32 both allow the passage of hydraulic oil from the oil pump 2 side to the first oil passage p6 side, and prevent the passage of hydraulic oil from the first oil passage p6 side to the oil pump 2 side. Thus, while one of the mechanical oil pump 21 and the electric oil pump 22 are operating, hydraulic oil discharged from the operating oil pump 2 is prevented from flowing back to the other oil pump 2. The first oil passage p6 is connected with a first pressure regulating valve 41, and also connected with a second pressure regulating valve 42 via a second oil passage p7, as will be described in more detail later. Accordingly, the mechanical oil pump 21 and the electric oil pump 22 have a structure in which hydraulic oil is supplied to the first pressure regulating valve 41 and the second pressure regulating valve 42 via the backflow preventive valves 31, 32, respectively. In addition, the first oil passage p6 is provided with a relief valve 33. In the present example, the relief valve 33 is provided such that an input port 33a is connected with the first oil passage p6, which is downstream of the first backflow preventive valve 31 and the second backflow preventive valve 32 and upstream of the first pressure regulating valve 41. The relief valve 33 is a valve that, if a hydraulic pressure of the hydraulic oil within the first oil passage p6 is equal to or higher than a predetermined valve opening pressure, discharges hydraulic oil to reduce the hydraulic pressure by communicatively connecting the input port 33a with an exhaust port 33b. Although not shown in the figure, the exhaust port 33b of the relief valve 33 is connected with the oil pan 25 and hydraulic oil flowing out of the exhaust port 33b is discharged to the oil pan 25.

1-2. Pressure Regulating Valve Area

The hydraulic control device 1 includes the first pressure regulating valve 41 and the second pressure regulating valve 42 that serve as a pressure regulating valve 4 for adjusting the hydraulic pressure of the hydraulic oil supplied from the oil pump 2 to a predetermined pressure. The first pressure regulating valve 41 is a valve for adjusting the hydraulic pressure of the hydraulic oil supplied from the oil pump 2 to a predetermined first pressure PL1. The second pressure regulating valve 42 is a valve for further adjusting the hydraulic pressure of the hydraulic oil post adjustment by the first pressure regulating valve 41 to a predetermined second pressure PL2 that is lower than the first pressure PL1. A reference oil chamber 41a of the first pressure regulating valve 41 and a reference oil chamber 42a of the second pressure regulating valve 42 are supplied with hydraulic oil having a standard pressure PLb via oil passage p9, which is supplied from respective linear solenoid valves (not shown). The hydraulic oil having the standard pressure PLb serves as a reference hydraulic pressure when the pressure of hydraulic oil is adjusted by the first pressure regulating valve 41 and the second pressure regulating valve 42. In addition, the hydraulic control device 1 is equipped with a feedback oil passage p4 that connects an intake oil passage p1 with an exhaust port 41d of the first pressure regulating valve 41 and an exhaust port 42d of the second pressure regulating valve 42. Note that in FIG. 1, the positions of spools 41p, 42p of the first pressure regulating valve 41 and the second pressure regulating valve 42 are divided into right and left sections to show two different states. The right halves in the figure show a state where the spools 41p, 42p are at an upward position, while the left halves in the figure show a state where the spools 41p, 42p are at a downward position. Note that in the following description, reference to the pressure regulating valve 4 collectively means both the first pressure regulating valve 41 and the second pressure regulating valve 42.

The first pressure regulating valve 41 is equipped with the spool 41p, and a spring 41s that biases the spool 41p toward one end side (a lower side in FIG. 1, likewise in the following description of the first pressure regulating valve 41). The first pressure regulating valve 41 is also equipped with the reference oil chamber 41a provided on the other end side of the spool 41p (an upper side in FIG. 1, likewise in the following description of the first pressure regulating valve 41), as well as a feedback oil chamber 41b, a pressure regulating port 41c, the exhaust port 41d, and an output port 41e provided on the one end side of the spool 41p. As described above, the reference oil chamber 41a is supplied with hydraulic oil having the standard pressure PLb. Meanwhile, the feedback oil chamber 41b is supplied with hydraulic oil whose pressure has been adjusted by the first pressure regulating valve 41 as a feedback pressure. Accordingly, the position of the spool 41p is determined by a balance between the feedback pressure acting on the one end side of the spool 41p, and the standard pressure PLb and an energizing force of the spring 41s acting on the other side. In other words, if the feedback pressure is higher than the sum of the standard pressure PLb and the energizing force of the spring 41s, then the spool 41p moves to the other side and a communicative opening amount between the pressure regulating port 41c and the exhaust port 41d increases. Conversely, if the feedback pressure is lower, the spool 41p moves to the one end side and the communicative opening amount between the pressure regulating port 41c and the exhaust port 41d decreases. Namely, the first pressure regulating valve 41 adjusts the amount of hydraulic oil discharged from the pressure regulating port 41c to the exhaust port 41d depending on the feedback pressure, which is a hydraulic pressure that has been adjusted by the first pressure regulating valve 41. Thus, the hydraulic pressure of the hydraulic oil within the first oil passage p6, which is in communication with the pressure regulating port 41c, is adjusted to the first pressure PL1.

Hydraulic oil discharged from the exhaust port 41d of the first pressure regulating valve 41 is sent to the intake oil passage p1 via the feedback oil passage p4. Accordingly, hydraulic oil discharged during pressure regulation performed by the first pressure regulating valve 41 does not pass through the strainer 24 and is again taken in by the intake ports 21a, 22a of the oil pump 2. As a consequence, it is possible to suppress an intake of air by the oil pump 2, and also possible to increase the efficiency of the oil pump 2 without pressure loss occurring due to hydraulic oil passing through the strainer 24. In addition, the output port 41e is connected with the second oil passage p7. The output port 41e is in communication with the pressure regulating port 41c when the feedback pressure is higher than the sum of the standard pressure PLb and the energizing force of the spring 41s, and the spool 41p moves a predetermined distance or more toward the other end side. In this state, hydraulic oil is sent from the pressure regulating port 41c to the second oil passage p7 via the output port 41e.

The first oil passage p6 is connected with the speed change mechanism 92 of the vehicle driving apparatus, and hydraulic oil whose pressure has been adjusted to the first pressure PL1 by the first pressure regulating valve 41 is sent to the speed change mechanism 92. Although not shown, when the speed change mechanism 92 includes a control valve for controlling the operation of a friction engagement element such as a clutch or a brake, and a hydraulic cylinder of the friction engagement element that operates to receive a supply of hydraulic oil from the control valve. In addition, the first oil passage p6 is connected with the second oil passage p7 via an orifice Or1. By regulating the flow of hydraulic oil from the first oil passage p6 to the second oil passage p7, the orifice Or1 plays the role of sending hydraulic oil to the second oil passage p7 side under a condition where the hydraulic pressure of the hydraulic oil within the first oil passage p6 and the hydraulic pressure of the hydraulic oil within the second oil passage p7 are practically independent of each other.

The second pressure regulating valve 42 has a structure practically identical to that of the first pressure regulating valve 41. Namely, the second pressure regulating valve 42 is equipped with a spool 42p, and a spring 42s that biases the spool 42p toward one end side (the upper side in FIG. 1, likewise in the following description of the second pressure regulating valve 42). The second pressure regulating valve 42 is also equipped with the reference oil chamber 42a provided on the other end side of the spool 42p (the lower side in FIG. 1, likewise in the following description of the second pressure regulating valve 42), as well as a feedback oil chamber 42b, a pressure regulating port 42c, and an exhaust port 42d provided on the one end side of the spool 42p. As described above, the reference oil chamber 42a is supplied with hydraulic oil having the standard pressure PLb. Meanwhile, the feedback oil chamber 42b is supplied with hydraulic oil whose pressure has been adjusted by the second pressure regulating valve 42 as a feedback pressure. Accordingly, the position of the spool 42p is determined by a balance between the feedback pressure acting on the one end side of the spool 42p, and the standard pressure PLb and an energizing force of the spring 42s acting on the other side. In other words, if the feedback pressure is higher than the sum of the standard pressure PLb and the energizing force of the spring 42s, then the spool 42p moves to the other side and a communicative opening amount between the pressure regulating port 42c and the exhaust port 42d increases. Conversely, if the feedback pressure is lower, the spool 42p moves to the one end side and the communicative opening amount between the pressure regulating port 42c and the exhaust port 42d decreases. Namely, the second pressure regulating valve 42 adjusts the amount of hydraulic oil discharged from the pressure regulating port 42c to the exhaust port 42d depending on the feedback pressure, which is a hydraulic pressure that has been adjusted by the second pressure regulating valve 42. Thus, the hydraulic pressure of the hydraulic oil within the second oil passage p7, which is in communication with the pressure regulating port 42c, is adjusted to the second pressure PL2.

Hydraulic oil discharged from the exhaust port 42d of the second pressure regulating valve 42 is sent to the intake oil passage p1 via the feedback oil passage p4. Accordingly, hydraulic oil discharged during pressure regulation performed by the second pressure regulating valve 42 does not pass through the strainer 24 and is again taken in by the intake ports 21a, 22a of the oil pump 2. As a consequence, it is possible to suppress an intake of air by the oil pump 2, and also possible to increase the efficiency of the oil pump 2 without pressure loss occurring due to hydraulic oil passing through the strainer 24.

The second oil passage p7, as explained above, is connected with the feedback oil chamber 42b and the pressure regulating port 42c of the second pressure regulating valve 42, and the hydraulic pressure of the hydraulic oil within the second oil passage p7 is adjusted to the second pressure PL2 by the second pressure regulating valve 42. In addition, the second oil passage p7 branches on a downstream side thereof, wherein one branched oil passage becomes a cooler supply oil passage p2 and another branched oil passage becomes a lubrication supply oil passage p8. The lubrication supply oil passage p8 is connected with the lubricating oil passage 91 of the vehicle driving apparatus, and hydraulic oil whose pressure has been adjusted to the second pressure PL2 by the second pressure regulating valve 42 is sent to the lubricating oil passage 91 via the lubrication supply oil passage p8. Note that the lubrication supply oil passage p8 is provided with an orifice Or2, and hydraulic oil flowing through the lubrication supply oil passage p8 is supplied to the lubricating oil passage 91 via the orifice Or2. Thus, hydraulic oil whose pressure has been adjusted by the second pressure regulating valve 42 is separated from hydraulic oil that passes through the cooler supply oil passage p2 and is supplied to an oil cooler 5, and is supplied to the lubricating oil passage 91 of the vehicle driving apparatus. Also note that hydraulic oil supplied to the lubricating oil passage 91 is ultimately discharged to the oil pan 25 after being used to lubricate respective portions of the vehicle driving apparatus.

1-3. Oil Cooler Area

The cooler supply oil passage p2 is connected with the oil cooler 5, and hydraulic oil whose pressure has been adjusted to the second pressure PL2 is supplied to the oil cooler 5. An orifice Or3 for adjusting an amount of hydraulic oil flowing to the lubrication supply oil passage p8 is provided in the cooler supply oil passage p2 downstream of a branch point with the lubrication supply oil passage p8. In addition, an input port 6a of a cooler bypass valve 6 is connected further downstream in the cooler supply oil passage p2. Here, no portions of the vehicle driving apparatus such as a torque converter are interposed among the supply path of hydraulic oil that goes from the second oil passage p7, through the cooler supply oil passage p2, and to the oil cooler 5. Accordingly, hydraulic oil supplied to the oil cooler 5 is supplied without passing respective portions of the vehicle driving apparatus after its pressure has been adjusted by the second pressure regulating valve 42. Therefore, hydraulic oil that contains foreign substances can be prevented from being taken in by the oil pump 2, even in a structure where a device for removing foreign substances such as a strainer is not provided in a cooler bypass oil passage p3 that returns hydraulic oil discharged to an output port 6b side of the cooler bypass valve 6 to the intake oil passage p1. Generally, when the vehicle driving apparatus is an automatic transmission equipped with a torque converter, a structure is often adopted in which hydraulic oil supplied to the oil cooler 5 first passes through the torque converter and is then supplied to the oil cooler 5. Meanwhile, when a hybrid vehicle driving apparatus is not equipped with a torque converter, a structure is often adopted in which hydraulic oil supplied to the oil cooler 5 is supplied thereto without passing through respective portions of the vehicle driving apparatus. Accordingly, the structure of the hydraulic control device 1 is particularly well suited to a device for supplying hydraulic oil to respective portions of a hybrid vehicle driving apparatus not equipped with a torque converter.

As explained above, the input port 6a of the cooler bypass valve 6 is connected with the cooler supply oil passage p2 in which hydraulic oil to be supplied to the oil cooler flows. The cooler bypass valve 6 is a relief valve that communicatively connects the input port 6a with the output port 6b when the hydraulic pressure of the hydraulic oil flowing through the cooler supply oil passage p2 is equal to or higher than a predetermined valve opening pressure. Namely, the cooler bypass valve 6 opens and communicatively connects the input port 6a with the output port 6b if the pressure of hydraulic oil within the input port 6a connected with the cooler supply oil passage p2 is equal to or higher than a predetermined valve opening pressure set in advance. Setting the valve opening pressure of the cooler bypass valve 6 will be described in more detail later. The output port 6b of the cooler bypass valve 6 is connected with the cooler bypass oil passage p3, which is connected with the intake oil passage p1. The cooler bypass oil passage p3 is an oil passage that connects the output port 6b of the cooler bypass valve 6 with the intake oil passage p1 at a location between the strainer 24 and the intake ports 21a, 22a of the oil pump 2. By providing the cooler bypass oil passage p3 in such a manner, it is possible to utilize a suction force of the oil pump 2 in order to quickly return hydraulic oil discharged to the output port 6b side of the cooler bypass valve 6 to the intake oil passage p1 between the strainer 24 and the intake ports 21a, 22a of the oil pump 2. As a consequence, it is possible to suppress an intake of air by the oil pump 2, and also possible to increase the efficiency of the oil pump 2 without pressure loss occurring due to hydraulic oil passing through the strainer 24.

The oil cooler 5 is a device for cooling hydraulic oil. Here, hydraulic oil whose pressure has been adjusted by the second pressure regulating valve 42 is supplied to the oil cooler 5 after passing through the cooler supply oil passage p2. The oil cooler 5 has a structure in which, for example, narrow tubes for heat exchange are arranged stacked and coolant or air flows adjacent to the narrow tubes. Having hydraulic oil flow through the narrow tubes achieves a structure in which heat is exchanged between the hydraulic oil and the coolant or air. Hydraulic oil after passing through the oil cooler 5 is then discharged to the oil pan 25 after passing through a cooler discharge oil passage p5. Note that the specific structure of the oil cooler 5 is not particularly limited and various known structures may be used.

According to the present embodiment, the relationship between the pressure loss of the oil cooler 5 and the valve opening pressure of the cooler bypass valve 6 is set as follows. At an oil temperature of a predetermined first temperature range, 90% or more of the total oil amount flowing through the cooler supply oil passage p2 is supplied to the oil cooler 5, whereas at an oil temperature of a second temperature range lower than the first temperature range, 90% or more of the total oil amount flowing through the cooler supply oil passage p2 passes through the cooler bypass valve 6 and is supplied to the cooler bypass oil passage p3. Here, the pressure loss of the oil cooler 5 increases depending on the magnitude of oil flow resistance when hydraulic oil passes through the oil cooler 5, and is determined by such factors as hydraulic oil viscosity, which varies according to the oil temperature, as well as the length, cross-sectional area, and shape of the narrow tubes structuring the oil cooler 5, for example. The valve opening pressure of the cooler bypass valve 6 is determined by such factors as the valve body shape (especially the area of the valve body subjected to the hydraulic pressure) and the magnitude of an energizing force of an energizing mechanism, such as a spring that biases the valve body. In the present embodiment, suitably setting the relationship between the pressure loss of the oil cooler 5 that changes depending on the hydraulic oil temperature and the valve opening pressure of the cooler bypass valve 6 achieves a structure that controls the supply of hydraulic oil to the appropriate path depending on the hydraulic oil temperature.

In other words, hydraulic oil generally has less viscosity as the oil temperature increases, and more viscosity as the oil temperature decreases. Hence in the hydraulic control device 1 according to the present embodiment, under a condition where the hydraulic oil temperature is relatively low while the viscosity is high, setting the pressure loss of the oil cooler 5 extremely large inhibits the flow of hydraulic oil to the oil cooler 5 side. In addition, the relationship between the pressure loss of the oil cooler 5 and the valve opening pressure of the cooler bypass valve 6 is set such that the hydraulic pressure of the hydraulic oil within the cooler supply oil passage p2, which increased due to the inhibition of the flow of hydraulic oil to the oil cooler 5 side, causes the cooler bypass valve 6 to open. The relationship between the pressure loss of the oil cooler 5 and the valve opening pressure of the cooler bypass valve 6 is further set such that, under the condition where the hydraulic oil temperature is relatively low while the viscosity is high, the pressure loss of the oil cooler 5 is sufficiently small and the hydraulic pressure of the hydraulic oil within the cooler supply oil passage p2 is equal to or less than the valve opening pressure of the cooler bypass valve 6.

More specifically, the relationship between the pressure loss of the oil cooler 5 and the valve opening pressure of the cooler bypass valve 6 is set such that, under a condition where the hydraulic oil temperature is equal to or less than a lower limit temperature of the first temperature range while the hydraulic oil viscosity is relatively low, the hydraulic pressure of the hydraulic oil within the cooler supply oil passage p2 dependent on the pressure loss of the oil cooler 5 is less than the valve opening pressure of the cooler bypass valve 6. Thus, practically all of the hydraulic oil flowing through the cooler supply oil passage p2 is supplied to the oil cooler 5 at a temperature of the first temperature range. Also, the relationship between the pressure loss of the oil cooler 5 and the valve opening pressure of the cooler bypass valve 6 is set such that, under a condition where the hydraulic oil temperature is equal to or less than an upper limit temperature of the second temperature range while the hydraulic oil viscosity is relatively high, the hydraulic pressure of the hydraulic oil within the cooler supply oil passage p2 is equal to or greater than the valve opening pressure of the cooler bypass valve 6. Furthermore, the amount of hydraulic oil flowing through the oil cooler 5 is less than 10% of the total amount of hydraulic oil flowing through the cooler supply oil passage p2. Thus, 90% or more of the total amount of hydraulic oil flowing through the cooler supply oil passage p2 passes through the cooler bypass valve 6 and is supplied to the cooler bypass oil passage p3 at a temperature of the second temperature range.

When setting the relationship between the pressure loss of the oil cooler 5 and the valve opening pressure of the cooler bypass valve 6, the first temperature range and the second temperature range are preferably set as follows. Namely, the hydraulic control device 1 according to the present embodiment is a device for supplying hydraulic oil to respective portions of the vehicle driving apparatus. Therefore, the first temperature range is preferably set so as to include a hydraulic oil temperature range following warming up (or during running) of the vehicle, and the second temperature range is preferably set so as to include a hydraulic oil temperature range for a vehicle cold start or the like. For example, the first temperature range may be set to 20 to 130° C. and the second temperature range may be set to −30 to 0° C. Note that only the lower limit temperature of the first temperature range may be set or only the upper limit of the second temperature range may be set.

2. Second Embodiment

Figure 2:
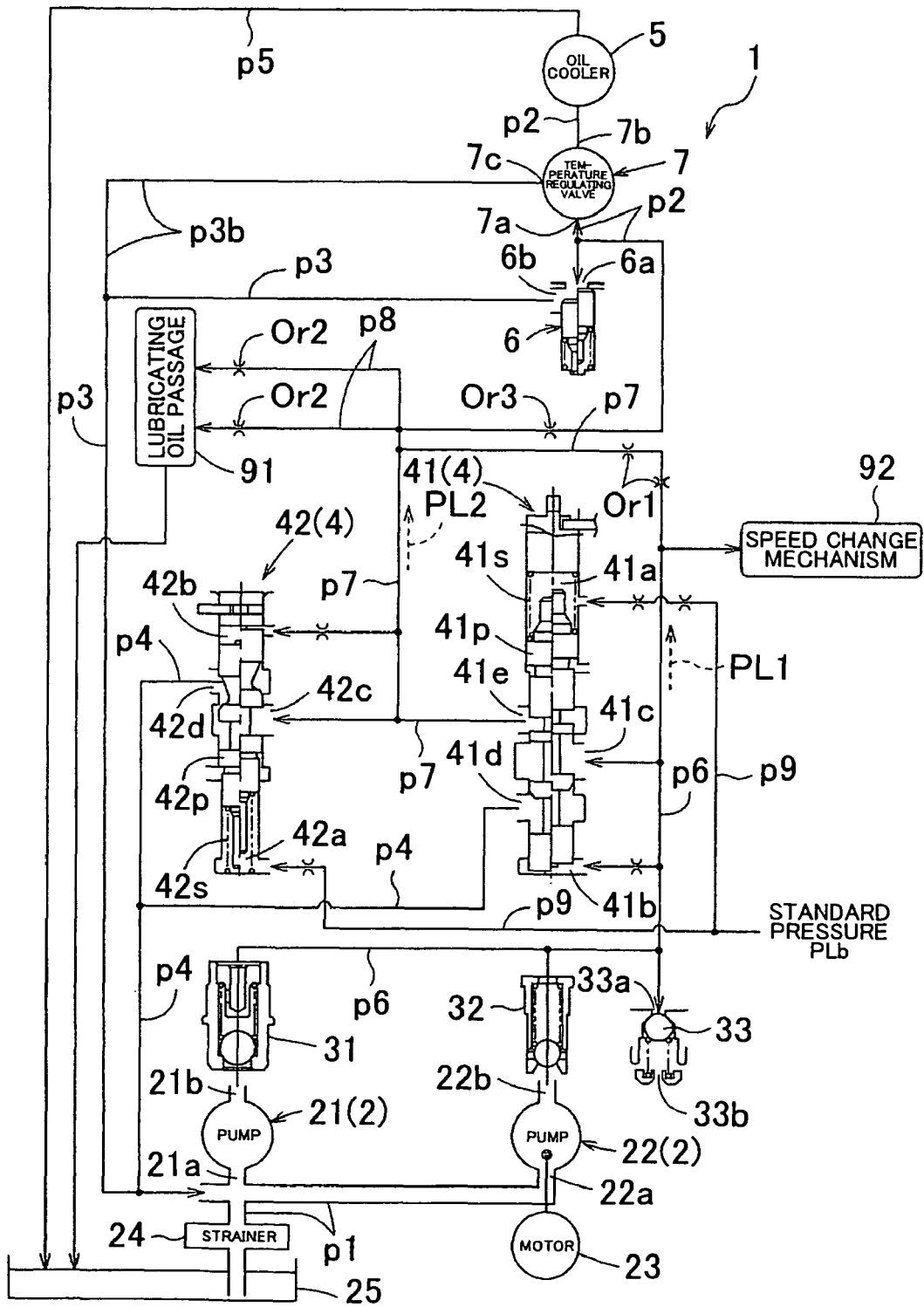
FIG. 2 is a drawing showing the structure of a hydraulic circuit of a hydraulic control device according to a second embodiment of the present invention.

A second embodiment of the present invention will be explained next. FIG. 2 is a drawing showing the structure of a hydraulic circuit of the hydraulic control device 1 according to the present embodiment. As shown in the figure, the hydraulic control device 1 according to the present embodiment differs from the first embodiment in that a temperature regulating valve 7 is provided between the oil cooler 5 and the input port 6a of the cooler bypass valve 6 among the cooler supply oil passage p2, and a second cooler bypass oil passage p3b is provided that connects the temperature regulating valve 7 with the intake oil passage p1. The following description will focus in detail on these differences of the hydraulic control device 1 according to the present embodiment with that of the first embodiment. Note that aspects not described in particular detail have structures similar to that of the first embodiment.

According to the present embodiment, the cooler supply oil passage p2 is connected with the oil cooler 5 via the temperature regulating valve 7. In addition, the input port 6a of the cooler bypass valve 6 is connected upstream of the temperature regulating valve 7 in the cooler supply oil passage p2. Namely, the hydraulic control device 1 is provided with the temperature regulating valve 7 among the cooler supply oil passage p2 between the oil cooler 5 and the input port 6a of the cooler bypass valve 6. The structure of the cooler bypass valve 6 is similar to that of the first embodiment, and the output port 6b of the cooler bypass valve 6 is connected with the cooler bypass oil passage p3, which is connected with the intake oil passage p1.

The temperature regulating valve 7 is a thermostat valve that switches a flow path depending on the hydraulic oil temperature. According to the present embodiment, in the temperature regulating valve 7, an input port 7a is connected on the upstream side of the cooler supply oil passage p2, a first output port 7b is connected on the downstream side of the cooler supply oil passage p2 that connects with the oil cooler 5, and a second output port 7c is connected with the second cooler bypass oil passage p3b. The temperature regulating valve 7 switches the flow path such that hydraulic oil is supplied to the oil cooler 5 at a temperature of the predetermined first temperature range, and hydraulic oil is supplied to the second cooler bypass oil passage p3b connected with the intake oil passage p1 at a temperature of the second temperature range, which is lower than the first temperature range. In other words, the temperature regulating valve 7 communicatively connects the input port 7a with the first output port 7b to supply hydraulic oil to the oil cooler 5 if the hydraulic oil temperature is in the relatively high first temperature range. However, the temperature regulating valve 7 communicatively connects the input port 7a with the second output port 7c to supply hydraulic oil to the second cooler bypass oil passage p3b if the hydraulic oil temperature is in the relatively low second temperature range. According to the present embodiment, the second cooler bypass oil passage p3b is connected with the cooler bypass oil passage p3, and is connected with the intake oil passage p1 via the cooler bypass oil passage p3. Note that the second cooler bypass oil passage p3b may also be structured separate from the cooler bypass oil passage p3 instead.

Here, the first temperature range and the second temperature range may be set similar to the first embodiment. Namely, the hydraulic control device 1 according to the present embodiment is a device for supplying hydraulic oil to respective portions of the vehicle driving apparatus. Therefore, the first temperature range is preferably set so as to include a hydraulic oil temperature range following warming up (or during running) of the vehicle, and the second temperature range is preferably set so as to include a hydraulic oil temperature range for a vehicle cold start or the like. Compared to the structure of the first embodiment, however, in the present embodiment it is possible to perform switching of the hydraulic oil supply path more precisely than in the first embodiment by setting the first temperature range and the second temperature range closer together, although transient characteristics of the temperature regulating valve 7 are also a consideration. Thus for example, the first temperature range may be set to 15 to 130° C. and the second temperature range may be set to −30 to 5° C. Note that only the lower limit temperature of the first temperature range may be set or only the upper limit of the second temperature range may be set. Also, a structure is possible in which the temperature regulating valve 7 distributes hydraulic oil to both the oil cooler 5 and the second cooler bypass oil passage p3b in a transient range between the first temperature range and the second temperature range.

3. Third Embodiment

Figure 3:
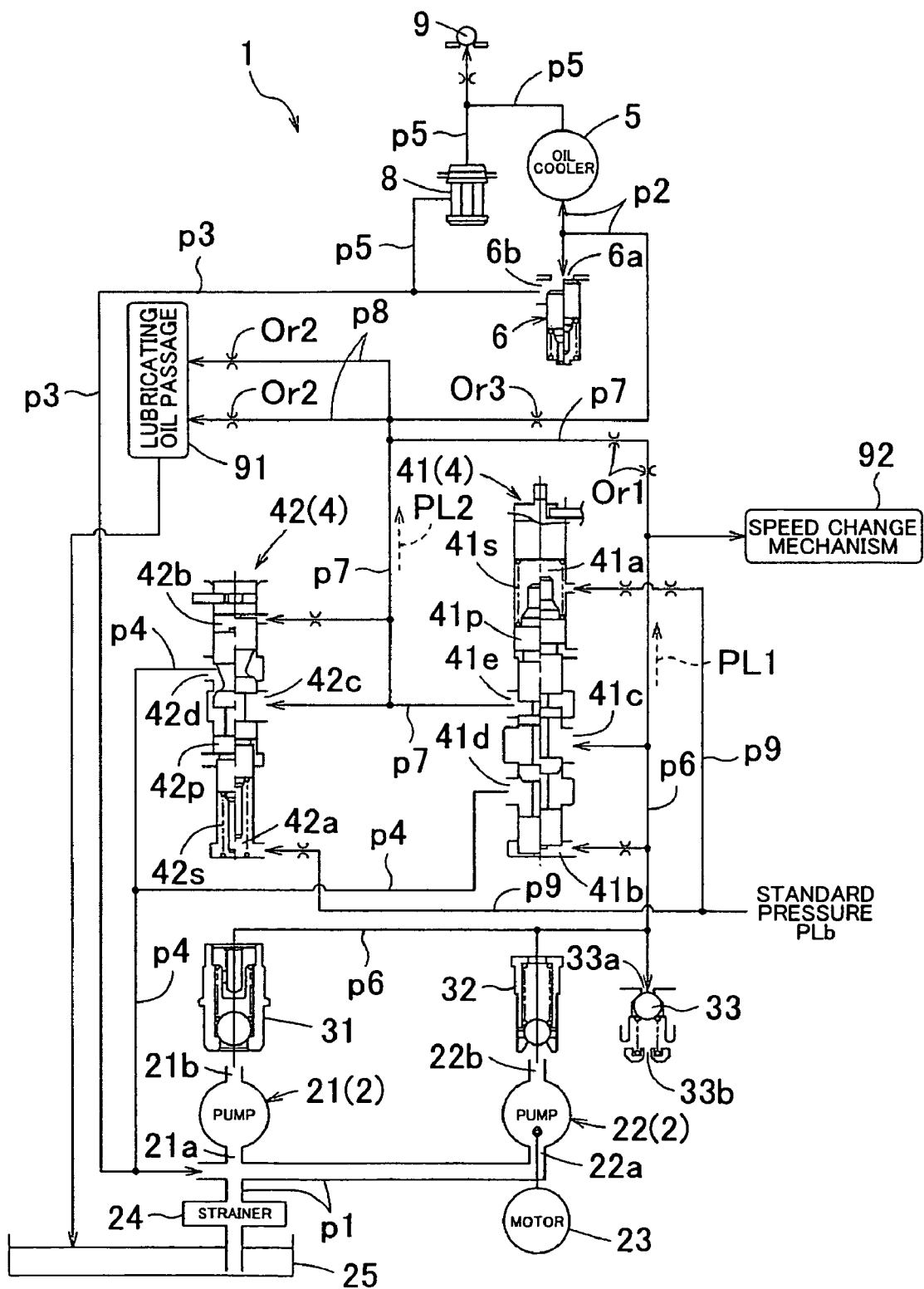
FIG. 3 is a drawing showing the structure of a hydraulic circuit of a hydraulic control device according to a third embodiment of the present invention.

A third embodiment of the present invention will be explained next. FIG. 3 is a drawing showing the structure of a hydraulic circuit of the hydraulic control device 1 according to the present embodiment. As shown in the figure, the hydraulic control device 1 according to the present embodiment differs from the first embodiment in that a structure is achieved where hydraulic oil that has passed through the oil cooler 5 is supplied to a cooler discharge oil passage p5 connected to the intake oil passage p1, and a sub strainer 8 is provided among the cooler discharge oil passage p5. The following description will focus in detail on these differences of the hydraulic control device 1 according to the present embodiment with that of the first embodiment. Note that aspects not described in particular detail have structures similar to that of the first embodiment.

According to the present embodiment, the cooler discharge oil passage p5, through which hydraulic oil that has passed through the oil cooler 5 flows, is connected with the cooler bypass oil passage p3. Namely, the cooler discharge oil passage p5 is connected with the intake oil passage p1 via the cooler bypass oil passage p3. Note that the structure of the cooler bypass valve 6 is similar to that of the first embodiment. Accordingly, the input port 6a of the cooler bypass valve 6 is connected with the cooler supply oil passage p2, through which hydraulic oil to be supplied to the oil cooler flows, and the output port 6b is connected with the cooler bypass oil passage p3 that connects with the intake oil passage p1. Thus according to the structure of the hydraulic control device 1 of the present embodiment, hydraulic oil that has passed through the oil cooler 5 can be returned to the intake oil passage p1 between the strainer 24 and the intake ports 21a, 22a of the oil pump 2 via the cooler discharge oil passage p5 and the cooler bypass oil passage p3. Likewise, hydraulic oil that has been discharged to the output port 6b side of the cooler bypass valve 6 can be returned via the cooler bypass oil passage p3. Therefore, since the hydraulic oil can be quickly returned to the intake ports 21a, 22a of the oil pump 2 by utilizing the suction force of the oil pump 2, it is possible to suppress the intake of air by the oil pump 2. In addition, hydraulic oil returned to the intake oil passage p1 in this manner is taken in by the intake ports 21a, 22a of the oil pump 2 without passing through the strainer 24. Therefore, it is possible to increase the efficiency of the oil pump 2 without pressure loss occurring due to hydraulic oil passing through the strainer 24.

In addition, the cooler discharge oil passage p5 is provided with the sub strainer 8. The sub strainer 8 acts as a filter for removing foreign substances contained in the hydraulic oil that has passed through the oil cooler 5. By adopting such a design, even if foreign substances become mixed with hydraulic oil within the oil cooler 5, such foreign substances can be removed by the sub strainer 8. Therefore, it is possible to prevent hydraulic oil containing foreign substances from being taken in by the oil pump 2. Note that in the present embodiment, an air bleeding valve 9 for releasing air within the cooler discharge oil passage p5 is provided farther upstream than the sub strainer 8 in the cooler discharge oil passage p5.

4. Other Embodiments (1) In the above first and second embodiments, the example of the first temperature range and the second temperature range settings is merely an example when the hydraulic control device 1 is applied to a device for supplying hydraulic oil to respective portions of the vehicle driving apparatus. Accordingly, the first temperature range and the second temperature may naturally be set to temperature ranges different from those in the above example.

(2) In the above embodiments, an example was explained in which the hydraulic control device 1 has a structure equipped with the feedback oil passage p4 that connects the intake oil passage p1 with the exhaust ports 41d, 42d of the pressure regulating valve 4. However, the range of applicability of the present invention is not limited to this example. Accordingly, a structure not equipped with the feedback oil passage p4 is also conceivable.

(3) In the above embodiments, a structure provided with two oil pumps 2, i.e., the mechanical oil pump 21 and the electric oil pump 22, was explained as an example. However, the range of applicability of the present invention is not limited to this example. Accordingly, other suitable embodiments of the present invention are a structure equipped with only one oil pump 2, or a structure equipped with three or more oil pumps 2.

(4) In the above embodiments, a structure provided with two pressure regulating valves 4, i.e., the first pressure regulating valve 41 and the second pressure regulating valve 42, was explained as an example. However, the range of applicability of the present invention is not limited to this example. Accordingly, other suitable embodiments of the present invention are a structure equipped with only one pressure regulating valve 4, or a structure equipped with three or more pressure regulating valves 4.

(5) In the above embodiments, an example was explained in which the hydraulic control device 1 is applied to a device for supplying hydraulic oil to a vehicle driving apparatus such as a driving apparatus for a hybrid vehicle, an automatic transmission or the like. However, the range of applicability of the present invention is not limited to this example. Accordingly, the present invention may also be applied as a hydraulic control device 1 for supplying hydraulic oil to hydraulic equipment and the like used for other than a vehicle driving apparatus.

The present invention may be used as a hydraulic control device for supplying hydraulic oil to a vehicle driving apparatus such as, for example, a driving apparatus for a hybrid vehicle, an automatic transmission or the like.

According to an exemplary aspects of the invention, due to reasons such as a low hydraulic oil temperature and high viscosity, if the hydraulic pressure of hydraulic oil supplied to the oil cooler is equal to or greater than the predetermined valve opening pressure, then hydraulic oil discharged to the output port side of the cooler bypass valve can be returned to the intake oil passage between the strainer and the intake port of the oil pump via the cooler bypass oil passage. Thus with regard to hydraulic oil discharged to the output port side of the cooler bypass valve, since the hydraulic oil can be quickly returned to the intake port of the oil pump by utilizing the suction force of the oil pump, it is possible to suppress the intake of air by the oil pump. In addition, hydraulic oil returned via the cooler bypass oil passage in this manner is taken in by the intake port of the oil pump without passing through the strainer. Therefore, it is possible to increase the efficiency of the oil pump without pressure loss occurring due to hydraulic oil passing through the strainer.

According to an exemplary aspect of the invention, the structure utilizes a characteristic of hydraulic oil where viscosity increases at lower oil temperatures. Hence, under a condition where the hydraulic oil temperature is relatively low while the viscosity is high, setting the pressure loss of the oil cooler extremely large inhibits the flow of hydraulic oil to the oil cooler side. In addition, the oil cooler and the cooler bypass valve are set such that the hydraulic pressure of the hydraulic oil within the cooler supply oil passage, which increased due to the inhibition of the flow of hydraulic oil to the oil cooler side, causes the cooler bypass valve to open. Thus according to this structure, if the hydraulic oil temperature is within the relatively low second temperature range, then practically all of the hydraulic oil flowing through the cooler supply oil passage can be quickly returned to the intake port of the oil pump via the cooler bypass oil passage without being sent to the oil cooler. As a consequence, it is possible to suppress an intake of air by the oil pump, and also possible to increase the efficiency of the oil pump without pressure loss occurring due to hydraulic oil passing through the strainer. Furthermore, when the hydraulic oil temperature is relatively low as in the above case, circulating the hydraulic oil without passing through oil cooler makes it possible to increase the hydraulic oil temperature faster. Moreover, the above structure can be achieved simply by setting a characteristic of the oil cooler and the cooler bypass valve, and does not require newly providing a device such as another valve. Therefore, the hydraulic control device overall can be made simple and compact, and an increase in manufacturing cost can also be suppressed.

Meanwhile, if the hydraulic oil temperature is within the relatively high first temperature range, then practically all of the hydraulic oil flowing through the cooler supply oil passage is returned to the oil cooler, thereby efficiently cooling the hydraulic oil. Since the oil cooler is set such that the pressure loss is extremely large under the condition of relatively low hydraulic oil temperature and high viscosity, an accompanying oil cooler characteristic is a potential to increase a cooling performance of hydraulic oil under the condition of high oil temperature and low viscosity. Based on the above, according to this structure, a hydraulic oil characteristic related to temperature can be utilized to both improve the efficiency and stability of oil pump operation at a low hydraulic oil temperature, and improve the cooling performance of hydraulic oil at a high hydraulic oil temperature.

According to an exemplary aspect of the invention, using the temperature regulating valve to switch the flow path of hydraulic oil makes it possible when the hydraulic oil temperature is within the relatively low second temperature range to quickly return hydraulic oil to the intake port of the oil pump via the second cooler bypass oil passage without sending hydraulic oil to the oil cooler. As a consequence, it is possible to suppress an intake of air by the oil pump, and also possible to increase the efficiency of the oil pump without pressure loss occurring due to hydraulic oil passing through the strainer. Furthermore, when the hydraulic oil temperature is relatively low as in the above case, circulating the hydraulic oil without passing through an oil cooler makes it possible to increase the hydraulic oil temperature faster. Meanwhile, if the hydraulic oil temperature is within the relatively high first temperature range, then hydraulic oil can be sent to the oil cooler to cool the hydraulic oil. Moreover, according to this structure, switching between the state of supplying hydraulic oil to the oil cooler and the state of supplying hydraulic oil to the second cooler bypass oil passage can be achieved with high precision by the temperature regulating valve.

According to an exemplary aspect of the invention, hydraulic oil that has passed through the oil cooler is discharged to the oil pan, after which it passes through the strainer, taken in by the oil pump, and then discharged. Thus, even if foreign substances become mixed with hydraulic oil within the oil cooler, such foreign substances can be removed by the strainer. Therefore, it is possible to prevent hydraulic oil containing foreign substances from being taken in by the oil pump.

According to an exemplary aspect of the invention, hydraulic oil that has passed through the oil cooler and hydraulic oil that has been discharged to the output port side of the cooler bypass valve can both be returned to the intake oil passage between the strainer and the intake port of the oil pump, via the cooler discharge oil passage and the cooler bypass oil passage. Therefore, since the hydraulic oil can be quickly returned to the intake port of the oil pump by utilizing the suction force of the oil pump, it is possible to suppress the intake of air by the oil pump. Thus, since the sub strainer is provided among the cooler discharge oil passage, even if foreign substances become mixed with hydraulic oil within the oil cooler, such foreign substances can be removed by the sub strainer. Therefore, it is possible to prevent hydraulic oil containing foreign substances from being taken in by the oil pump.

According to an exemplary aspect of the invention, due to adjustment of the hydraulic pressure of the hydraulic oil by the pressure regulating valve, hydraulic oil discharged from the pressure regulating valve can also be returned to the intake oil passage between the strainer and the intake port of the oil pump via the feedback oil passage. As a consequence, since the amount of hydraulic oil returned to the intake port of the oil pump can be increased, it is possible to suppress an intake of air by the oil pump, and also possible to increase the efficiency of the oil pump without pressure loss occurring due to hydraulic oil passing through the strainer.

According to an exemplary aspect of the invention, hydraulic oil can be supplied at one of two pressures, i.e., the first pressure or the second pressure, depending on the requirement of a supply destination of hydraulic oil for the vehicle driving apparatus or the like. In addition, after such a supply destination has been given priority and supplied with hydraulic oil, excess hydraulic oil can be targeted for cooling by the oil cooler as appropriate.

According to an exemplary aspect of the invention, even if two oil pumps are driven by different driving sources, for example, it is possible to prevent hydraulic oil discharged out of one of the oil pumps from flowing back to the other oil pump. Therefore, the discharge of hydraulic oil from two oil pumps can be appropriately performed.

According to an exemplary aspect of the invention, foreign substances can be prevented from mixing with hydraulic oil by allowing hydraulic oil supplied to the oil cooler to pass through respective portions of the vehicle driving apparatus before reaching the cooler supply oil passage. Therefore, hydraulic oil containing foreign substances can be prevented from being taken in by the oil pump even with a structure in which hydraulic oil discharged to the output port side of the cooler bypass valve is returned to the intake oil passage between the strainer and the intake port of the oil pump.

According to an exemplary aspect of the invention, hydraulic oil whose pressure has been adjusted by the pressure regulating valve can be supplied to the lubricating oil passage of the vehicle driving apparatus, and at the same time, excess hydraulic oil can be targeted for cooling by the oil cooler as appropriate.

What is claimed is:

1. A hydraulic control device comprising:
    an oil pan;
    an oil pump;
    a strainer that is provided between the oil pan and an intake port of the oil pump;
    a pressure regulating valve that adjusts a hydraulic pressure of hydraulic oil supplied from the oil pump to a predetermined pressure;
    an oil cooler that is supplied with the hydraulic oil whose pressure has been adjusted by the pressure regulating valve and that cools the hydraulic oil;
    a cooler bypass valve with an input port that is connected with a cooler supply oil passage through which the hydraulic oil to be supplied to the oil cooler flows, wherein the input port is communicatively connected with an output port when the hydraulic pressure of the hydraulic oil within the cooler supply oil passage is equal to or greater than a predetermined valve opening pressure; and
    a cooler bypass oil passage that connects the output port of the cooler bypass valve with an intake oil passage between the strainer and the intake port of the oil pump.

2. The hydraulic control device according to claim 1, wherein a relationship between a pressure loss of the oil cooler and a valve opening pressure of the cooler bypass valve is set such that:
    at an oil temperature of a first temperature range, 90% or more of a total oil amount flowing through the cooler supply oil passage is supplied to the oil cooler, and
    at an oil temperature of a second temperature range lower than the first temperature range, 90% or more of the total oil amount flowing through the cooler supply oil passage passes through the cooler bypass valve and is supplied to the cooler bypass oil passage.

3. The hydraulic control device according to claim 2, wherein the hydraulic oil that has passed through the oil cooler is discharged to the oil pan.

4. The hydraulic control device according to claim 3, further comprising:
    a feedback oil passage that connects a discharge port of the pressure regulating valve to the intake oil passage.

5. The hydraulic control device according to claim 4, wherein:
    serving as the pressure regulating valve are a first pressure regulating valve that adjusts the hydraulic pressure of the hydraulic oil supplied from the oil pump to a predetermined first pressure and a second pressure regulating valve that further adjusts the hydraulic pressure of the hydraulic oil adjusted by the first pressure regulating valve to a predetermined second pressure that is lower than the first pressure, and the hydraulic oil whose pressure has been adjusted to the second pressure is supplied to the oil cooler.

6. The hydraulic control device according to claim 5, wherein:

serving as the oil pump are a first oil pump and a second oil pump, and the first oil pump and the second pump supply the hydraulic oil to the pressure regulating valve via respective backflow preventive valves.

7. The hydraulic control device according to claim 6, wherein:

the hydraulic control device supplies the hydraulic oil to respective portions of a vehicle driving apparatus, and the hydraulic oil to be supplied to the oil cooler is supplied by the pressure regulating valve without passing through respective portions of the vehicle driving apparatus after the hydraulic pressure has been adjusted.

8. The hydraulic control device according to claim 7, wherein the hydraulic oil whose pressure has been adjusted by the pressure regulating valve is separated from the hydraulic oil supplied to the oil cooler, and is supplied to a lubricating oil passage of the vehicle driving apparatus.

9. The hydraulic control device according to claim 1, further comprising:

a temperature regulating valve is provided in the cooler supply oil passage between the oil cooler and the input port of the cooler bypass valve, wherein:

the temperature regulating valve switches a flow path such that the hydraulic oil is supplied to the oil cooler at a temperature of a first temperature range, and the hydraulic oil is supplied to a second cooler bypass oil passage connected with the intake oil passage at a temperature of a second temperature range, which is lower than the first temperature range.

10. The hydraulic control device according to claim 9, wherein the hydraulic oil that has passed through the oil cooler is discharged to the oil pan.

11. The hydraulic control device according to claim 10, further comprising:

a feedback oil passage that connects a discharge port of the pressure regulating valve to the intake oil passage.

12. The hydraulic control device according to claim 11, wherein:

serving as the pressure regulating valve are a first pressure regulating valve that adjusts the hydraulic pressure of the hydraulic oil supplied from the oil pump to a predetermined first pressure and a second pressure regulating valve that further adjusts the hydraulic pressure of the hydraulic oil adjusted by the first pressure regulating valve to a predetermined second pressure that is lower than the first pressure, and the hydraulic oil whose pressure has been adjusted to the second pressure is supplied to the oil cooler.

13. The hydraulic control device according to claim 12, wherein:

serving as the oil pump are a first oil pump and a second oil pump, and the first oil pump and the second pump supply the hydraulic oil to the pressure regulating valve via respective backflow preventive valves.

14. The hydraulic control device according to claim 13, wherein:

the hydraulic control device supplies the hydraulic oil to respective portions of a vehicle driving apparatus, and the hydraulic oil to be supplied to the oil cooler is supplied by the pressure regulating valve without passing through respective portions of the vehicle driving apparatus after the hydraulic pressure has been adjusted.

15. The hydraulic control device according to claim 14, wherein hydraulic oil whose pressure has been adjusted by the pressure regulating valve is separated from the hydraulic oil supplied to the oil cooler, and is supplied to a lubricating oil passage of the vehicle driving apparatus.

16. The hydraulic control device according to claim 1, wherein the hydraulic oil that has passed through the oil cooler is discharged to the oil pan.

17. The hydraulic control device according to claim 1, wherein the hydraulic oil that has passed through the oil cooler is supplied to a cooler discharge oil passage connected with the intake oil passage, and a sub strainer is provided in the cooler discharge oil passage.

18. The hydraulic control device according to claim 17, further comprising:

a feedback oil passage that connects a discharge port of the pressure regulating valve to the intake oil passage.

19. The hydraulic control device according to claim 18, wherein:

serving as the pressure regulating valve are a first pressure regulating valve that adjusts the hydraulic pressure of the hydraulic oil supplied from the oil pump to a predetermined first pressure and a second pressure regulating valve that further adjusts the hydraulic pressure of the hydraulic oil adjusted by the first pressure regulating valve to a predetermined second pressure that is lower than the first pressure, and the hydraulic oil whose pressure has been adjusted to the second pressure is supplied to the oil cooler.

20. The hydraulic control device according to claim 19, wherein:

serving as the oil pump are a first oil pump and a second oil pump, and the first oil pump and the second pump supply the hydraulic oil to the pressure regulating valve via respective backflow preventive valves.

21. The hydraulic control device according to claim 20, wherein:

the hydraulic control device supplies the hydraulic oil to respective portions of a vehicle driving apparatus, and the hydraulic oil to be supplied to the oil cooler is supplied by the pressure regulating valve without passing through respective portions of the vehicle driving apparatus after the hydraulic pressure has been adjusted.

22. The hydraulic control device according to claim 21, wherein the hydraulic oil whose pressure has been adjusted by the pressure regulating valve is separated from the hydraulic oil supplied to the oil cooler, and is supplied to a lubricating oil passage of the vehicle driving apparatus.

23. The hydraulic control device according to claim 1, further comprising:

a feedback oil passage that connects a discharge port of the pressure regulating valve to the intake oil passage.

24. The hydraulic control device according to claim 1, wherein:

serving as the pressure regulating valve are a first pressure regulating valve that adjusts the hydraulic pressure of the hydraulic oil supplied from the oil pump to a predetermined first pressure and a second pressure regulating valve that further adjusts the hydraulic pressure of the hydraulic oil adjusted by the first pressure regulating valve to a predetermined second pressure that is lower than the first pressure, and the hydraulic oil whose pressure has been adjusted to the second pressure is supplied to the oil cooler.

25. The hydraulic control device according to claim 1, wherein:

serving as the oil pump are a first oil pump and a second oil pump, and the first oil pump and the second pump supply the hydraulic oil to the pressure regulating valve via respective backflow preventive valves.

26. The hydraulic control device according to claim 1, wherein:

the hydraulic control device supplies the hydraulic oil to respective portions of a vehicle driving apparatus, and the hydraulic oil to be supplied to the oil cooler is supplied by the pressure regulating valve without passing through respective portions of the vehicle driving apparatus after the hydraulic pressure has been adjusted.

* * * * *